(12) United States Patent
Laatiaoui et al.

(10) Patent No.: US 10,598,164 B2
(45) Date of Patent: Mar. 24, 2020

(54) METERING MECHANISM FOR A PUMP, METHODS FOR LOCKING AND UNLOCKING SUCH A MECHANISM

(71) Applicant: DOSATRON INTERNATIONAL, Tresses (FR)

(72) Inventors: Najib Laatiaoui, Begles (FR); Richard Mahieux, Cursan (FR)

(73) Assignee: DOSATRON INTERNATIONAL, Tresses (FR)

( * ) Notice: Subject to any disclaimer, the term of this patent is extended or adjusted under 35 U.S.C. 154(b) by 0 days.

(21) Appl. No.: 16/091,628

(22) PCT Filed: Apr. 6, 2017

(86) PCT No.: PCT/EP2017/058254
§ 371 (c)(1),
(2) Date: Oct. 5, 2018

(87) PCT Pub. No.: WO2017/174722
PCT Pub. Date: Oct. 12, 2017

(65) Prior Publication Data
US 2019/0154018 A1    May 23, 2019

(30) Foreign Application Priority Data
Apr. 7, 2016 (FR) ...................... 16 53061

(51) Int. Cl.
*F04B 13/02* (2006.01)
*F04B 9/107* (2006.01)
*F16H 25/20* (2006.01)

(52) U.S. Cl.
CPC ............. *F04B 13/02* (2013.01); *F04B 9/107* (2013.01); *F16H 25/2006* (2013.01)

(58) Field of Classification Search
CPC ....... F04B 13/02; F04B 9/107; F16H 25/2006
See application file for complete search history.

(56) References Cited

U.S. PATENT DOCUMENTS

| 3,945,772 A | * | 3/1976 | Van de Moortele .... F04B 13/02 |
| | | | 417/489 |
| 4,229,413 A | | 10/1980 | Marteau D Autry |

(Continued)

FOREIGN PATENT DOCUMENTS

| EP | 1 971 774 A1 | 9/2008 |
| EP | 1 971 776 A1 | 9/2008 |

(Continued)

OTHER PUBLICATIONS

International Search Report, dated Jul. 3, 2017, from corresponding PCT application No. PCT/EP2017/058254.

*Primary Examiner* — Thomas E Lazo
(74) *Attorney, Agent, or Firm* — Young & Thompson

(57) ABSTRACT

A metering mechanism includes a body mounted in a sleeve covering the top and an adjustment nut covering the bottom, the adjustment nut threaded to the sleeve, the screw connection then causing rotation of the adjustment nut with respect to the body of the metering mechanism, the body being extended by a valve seat that can be closed by a valve, able to receive a plunger of which the reciprocating motion permits intake at the valve, the travel of the plunger depending on the screw position between the adjustment nut and the sleeve. The metering mechanism further includes a rotation lock between the adjustment nut and the body of the metering mechanism to prevent the adjustment nut being screwed or unscrewed on the sleeve. Also disclosed is a method for locking and unlocking such a mechanism, and to a proportional metering pump incorporating such a mechanism.

20 Claims, 5 Drawing Sheets

(56) References Cited

U.S. PATENT DOCUMENTS

| | | | | |
|---|---|---|---|---|
| 6,129,526 | A * | 10/2000 | Kelly | F04B 13/02 417/403 |
| 7,975,597 | B2 | 7/2011 | Darbois et al. | |
| 8,132,497 | B2 | 3/2012 | Darbois et al. | |
| 9,303,634 | B2 * | 4/2016 | Furet | F04B 9/105 |
| 9,689,765 | B2 * | 6/2017 | Lucas | F04B 9/105 |
| 2017/0107982 | A1 | 4/2017 | Cedrone et al. | |
| 2017/0114879 | A1 | 4/2017 | Cedrone et al. | |

FOREIGN PATENT DOCUMENTS

| | | |
|---|---|---|
| FR | 2 389 104 A1 | 11/1978 |
| FR | 2 896 279 A1 | 7/2007 |
| FR | 2 896 281 A1 | 7/2007 |
| WO | 2007/080249 A1 | 7/2007 |
| WO | 2007/080250 A1 | 7/2007 |
| WO | 2015/184056 A1 | 12/2015 |

* cited by examiner

METERING MECHANISM FOR A PUMP, METHODS FOR LOCKING AND UNLOCKING SUCH A MECHANISM

The invention relates to a metering mechanism of a proportional metering pump of the type comprising a hydraulic machine supplied with a main liquid and a secondary liquid, and a mechanism for metering the secondary liquid. Another subject of the invention is a method for locking and unlocking such a metering mechanism.

Proportional metering pumps generally comprise a hydraulic machine. Conventionally, the hydraulic machine extends along a longitudinal axis, and is provided with an inlet, an outlet, an access nozzle to a mixing chamber, and a metering mechanism. This metering mechanism is provided with a suction valve and communicates at one of its ends with the mixing chamber internal to the pump and, at the other of its ends, with a container of product to be sucked. The hydraulic machine is provided with a member designed to perform a reciprocating movement, the supplying of the pump with liquid at the inlet triggering the reciprocating movement of the member, said movement alternately provoking a suction through the metering mechanism into the mixing chamber with opening of the first suction valve when the member moves away from the metering mechanism then an expulsion at the outlet of the pump with closure of the first suction valve when the member approaches the metering mechanism.

Figure 3:
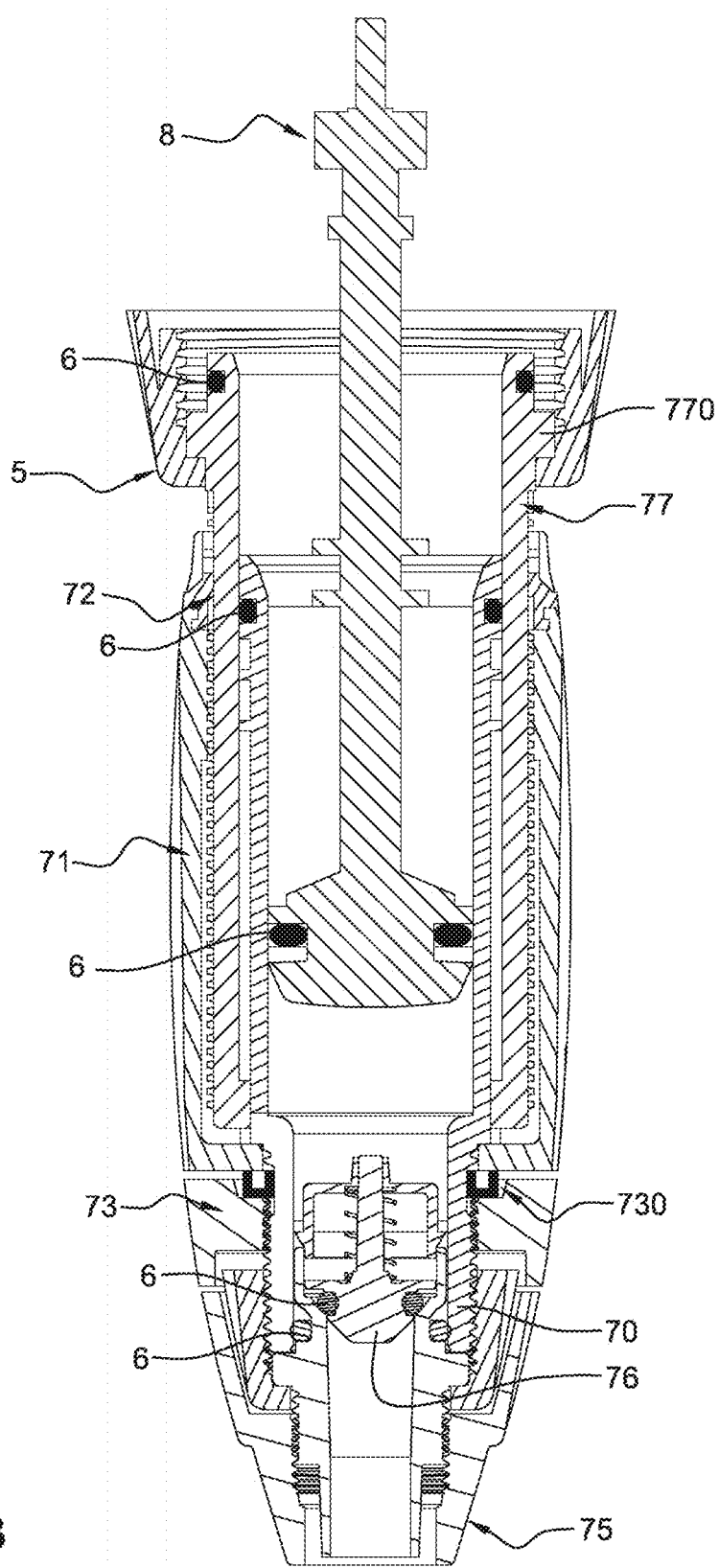

FIG. 3 represents, in particular, a metering mechanism of the prior art 7 capable of adjusting the volume sucked by said mechanism. This metering mechanism 7 comprises a body 70 mounted to translate in a sleeve 77, which is itself mounted in an adjustment nut 71. The adjustment nut cooperates by screwing with said sleeve, said screwing then causing a rotation of the adjustment nut relative to the body of the metering mechanism. The body is extended by a valve seat 75 that can be closed by a valve 76 and that is capable of accommodating a plunger 8, the reciprocating movement of which allows at least a suction at the valve seat. The travel of the plunger 8 therefore depends on the position of screwing of the sleeve relative to the adjustment nut. It follows that the volume sucked into the container upon the opening of the valve 76 is more or less great depending on the position of screwing of the sleeve relative to the adjustment nut. Since the volume of water for a cycle is quasi-constant, the metering is more or less great depending on the volume sucked into the container.

The metering mechanism further comprises seals 6 between the body and the sleeve, between the end of the plunger and the body and at the coupling with the mixing chamber of the hydraulic machine. The coupling is performed in particular by means of a nut 5 mounted on a shoulder 770 of the sleeve 77.

In order to block the rotation of the adjustment nut 71 relative to the body 70, a blocking ring 73 mounted on the body 70 is screwed against the adjustment nut via the abutment 730. The abutment 730 keeps the adjustment nut 71 pressed against a shoulder formed on the body 70, and because of this the adjustment nut is blocked in rotation. The abutment 730 makes it possible to drive the body 70 downward when wanting to lower the body 70 without blocking the adjustment nut 71 on the locking ring 73. It also serves to prevent the adjustment nut 71 from coming against the ring 73.

However, in use, this type of locking presents a lack of reliability due to the fact that the user does not know how far to go to unlock the mechanism, which can lead to a dismantling of the locking ring. Furthermore, the locking of the mechanism depends on the tightening by the user, which renders the metering inaccurate.

This is why the object of the invention is to mitigate all or some of the abovementioned drawbacks by proposing a device and a method for mounting and dismantling, making it possible to prevent the accidental separation between the adjustment of the metering mechanism and the hydraulic machine.

More particularly, the subject of the invention is a metering mechanism comprising a body mounted to translate in a sleeve which is itself mounted in an adjustment nut, said adjustment nut being capable of cooperating by screwing with said sleeve, said screwing then causing a rotation of the adjustment nut relative to the body of the metering mechanism, said body being extended by a valve seat that can be closed by a valve and that is capable of accommodating a plunger, the reciprocating movement of which allows a suction at the valve, the travel of the plunger being a function of the position of screwing between the adjustment nut and the sleeve, characterized in that the metering mechanism further comprises means for activating the blocking of the rotation between the adjustment nut and the body of the metering mechanism so as to prohibit the screwing and the unscrewing between the adjustment nut and the sleeve, said means comprising a ring housed in a locking nut mounted to rotate around the body of the mechanism, said ring cooperating by screwing with said nut, said ring being mounted to translate around and along the body of the metering mechanism between a first position of abutment at the bottom of the locking nut and a second position of abutment against the adjustment nut involving the rotational blocking of the adjustment nut rendered secure by complementarity of form with the ring.

Optional features of the invention, complementary or substitute, are stated herein-below.

The ring can be mounted to translate along the body of the metering mechanism by means of a slide link produced by means of at least one lug formed on the inner circumferential surface of the ring, said lug being capable of sliding in a groove formed on the outer circumferential surface of the body.

The ring can be mounted to translate along the body of the metering mechanism by means of a slide link produced by means of at least one rib formed on the outer circumferential surface of the body, said rib being capable of sliding in a groove formed in the inner circumferential surface of the ring.

The ring can cooperate by screwing with the locking nut by means of a slider formed on the outer circumferential surface of the ring, said slider being capable of sliding along a helix formed on the inner circumferential surface of the locking nut.

The ring can cooperate by screwing with the locking nut by means of a slider formed on the inner circumferential surface of the locking nut, said slider being capable of sliding along a helix formed on the outer circumferential surface of the ring.

The rotational blocking by complementarity of form of the ring against the adjustment nut can be performed by means of a claw coupling formed between a face of the ring and a shoulder of the adjustment nut, facing one another.

The means for activating the blocking of the rotation between the adjustment nut and the body of the metering mechanism can further comprise a circlip capable of translationally blocking the locking nut relative to the body of the metering mechanism.

The mechanism can comprise metering display means formed on the outer circumferential surface of the sleeve.

The mechanism can comprise sealing means interposed between the body and the sleeve.

The sleeve can comprise a shoulder capable of retaining a fixing nut on a hydraulic machine.

Another subject of the invention is a proportional metering pump comprising a hydraulic machine provided with an inlet and an outlet, a metering mechanism communicating at one of its ends with an access nozzle to a mixing chamber internal to the pump and, at the other of its ends, with a tank of product to be metered, the hydraulic machine extending along a longitudinal axis and enclosing a member designed to perform a reciprocating movement, the supplying of the pump with liquid at the inlet triggering the reciprocating movement of the member, said movement alternately provoking a suction through the metering mechanism into the mixing chamber with opening of a suction valve when the member moves away from the metering mechanism, then an expulsion at the outlet of the pump with closure of the suction valve when the member approaches the metering mechanism, characterized in that the metering mechanism conforms to one of the embodiments of the invention.

Another subject of the invention is a method for locking a metering mechanism conforming to one of the embodiments of the invention, characterized in that:
- the adjustment nut is turned to select the desired metered quality,
- the means are activated by turning the locking nut in order to bring the ring into its second position of abutment against the adjustment nut in order to rotationally block the adjustment nut by complementarity of form.

Another subject of the invention is a method for unlocking a metering mechanism conforming to one of the embodiments of the invention, characterized in that the means are deactivated by turning the locking nut in order to bring the ring into its first position of abutment disengaged from the adjustment nut, in order to render the adjustment nut free to rotate with respect to the ring.

Figure 1:
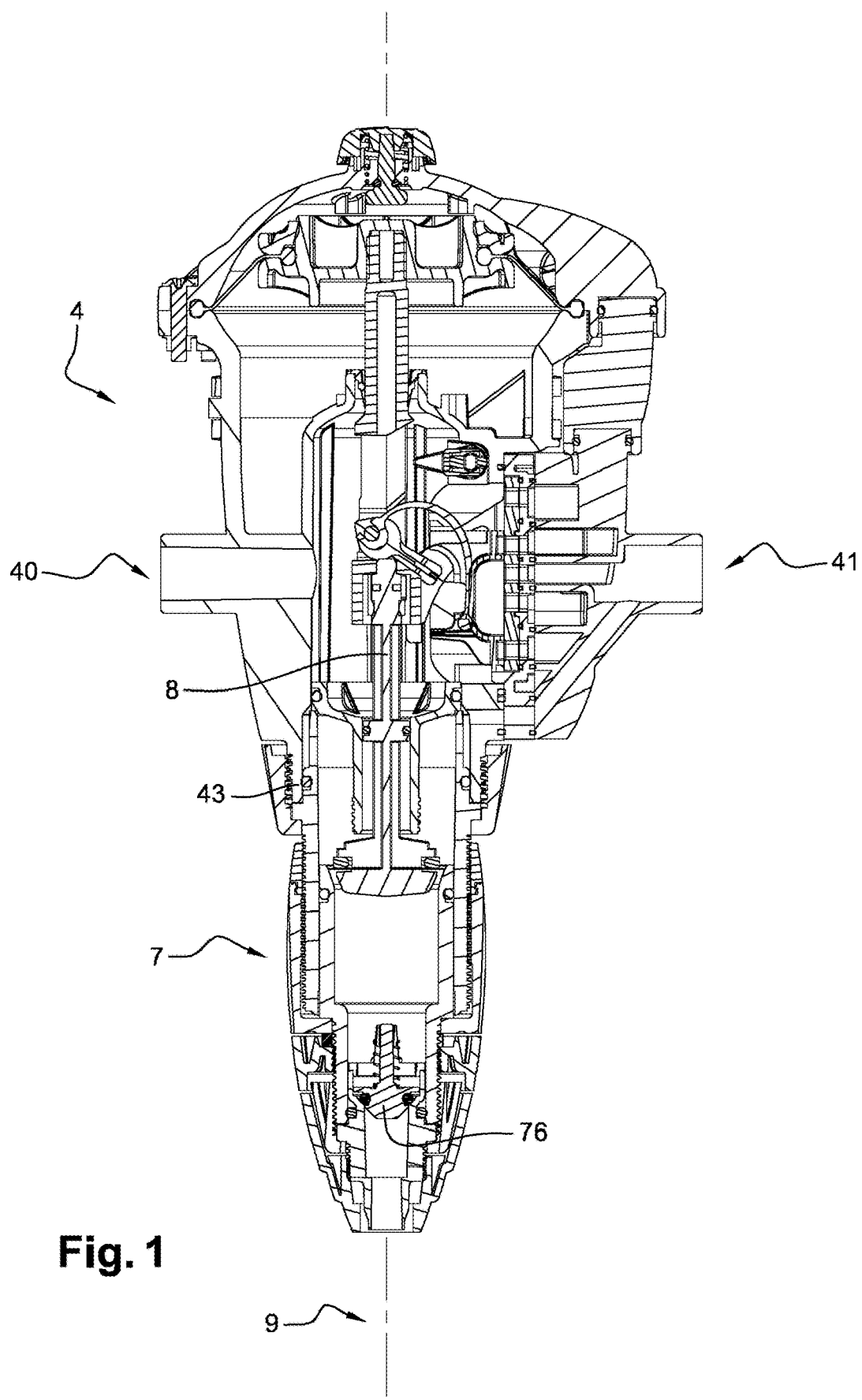
Figure 2:
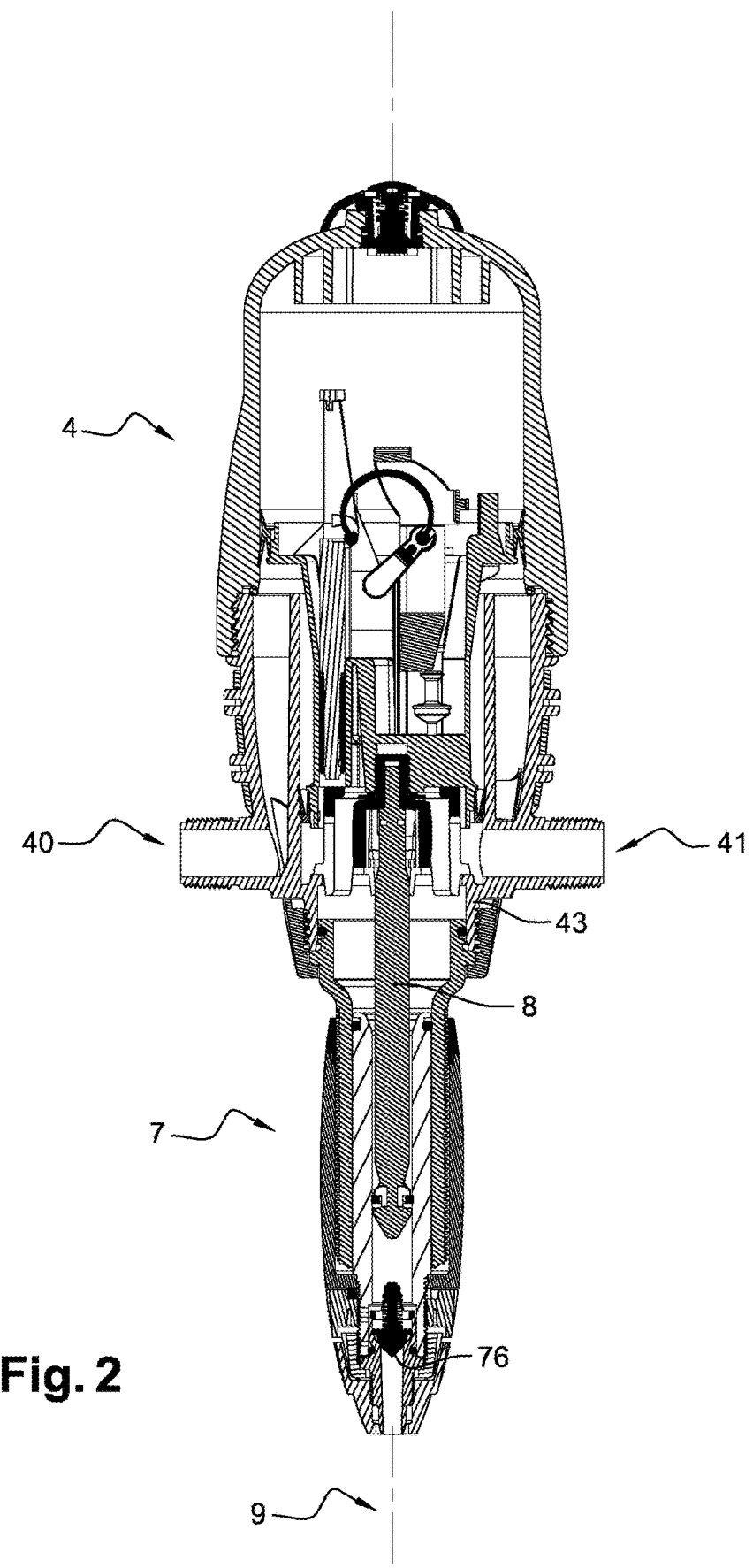
Figure 4:
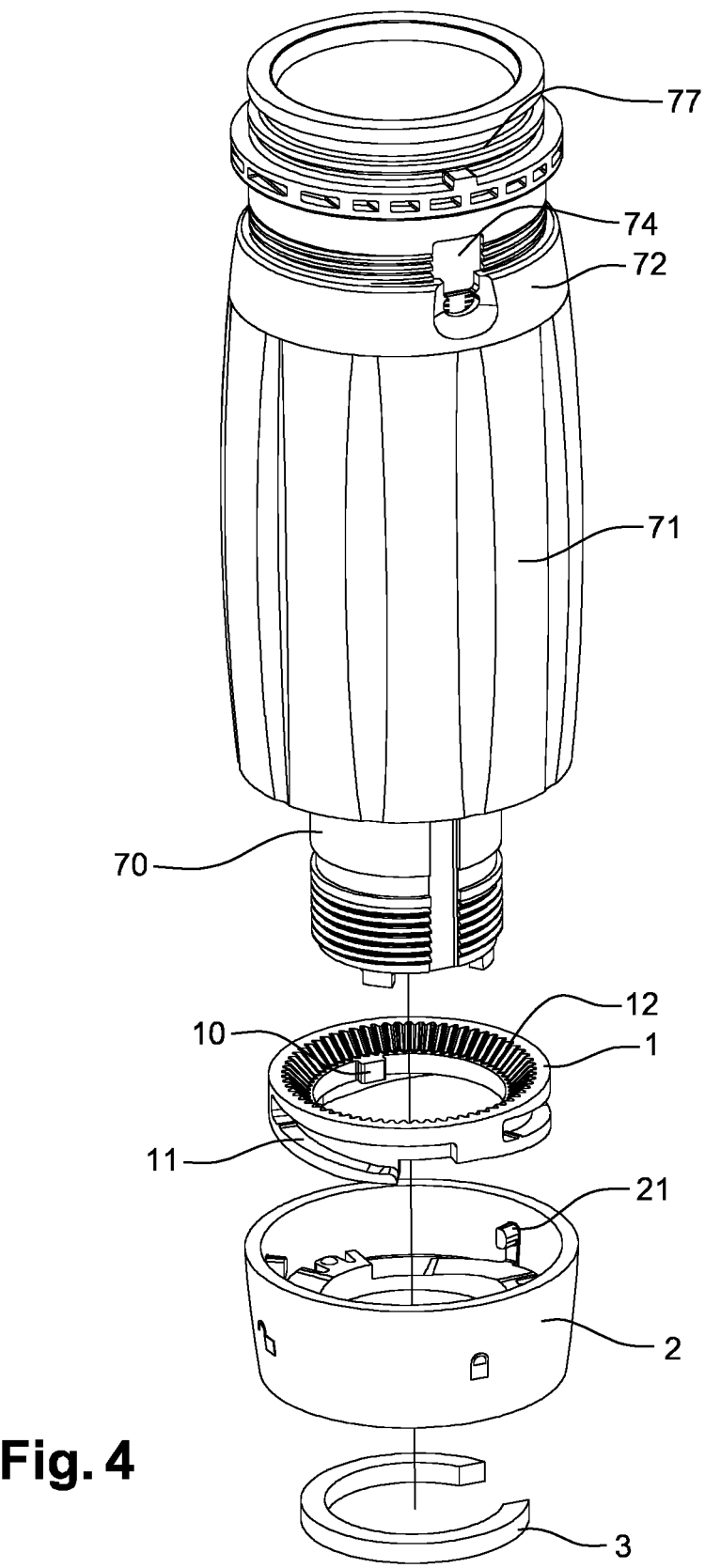
Figure 5:
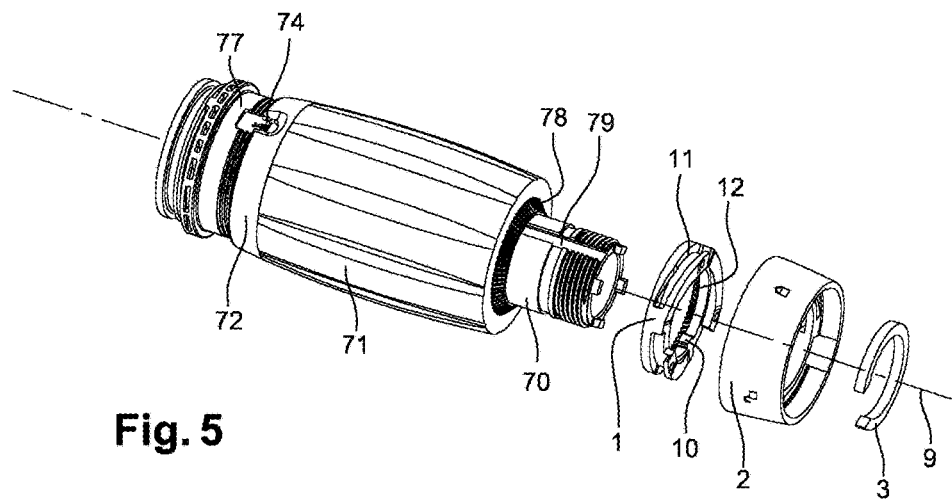
Figure 6:
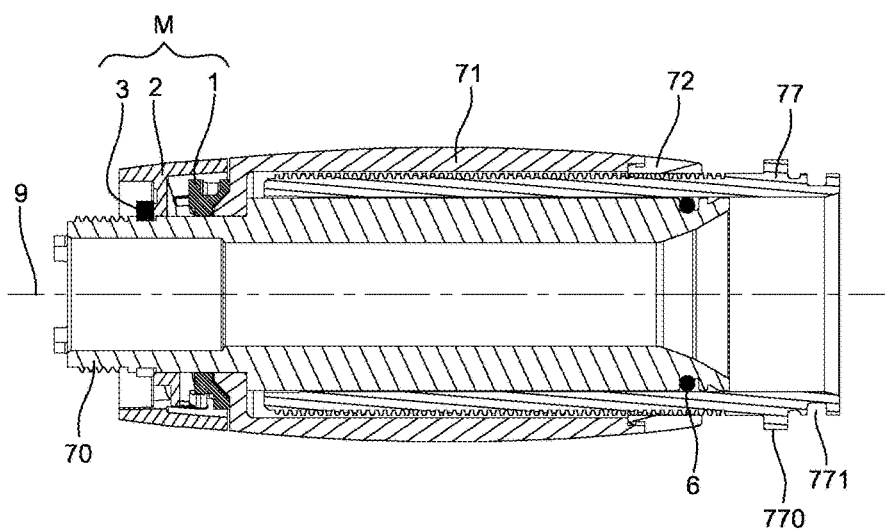

Other advantages and particular features of the invention will become apparent on reading the detailed description of nonlimiting implementations and embodiments, and the following attached drawings:

FIG. 1 is a schematic representation of a proportional metering pump using a first type of hydraulic machine, FIG. 2 is a schematic representation of a proportional metering pump using a second type of hydraulic machine, FIG. 3 is a representation of a detailed view of a metering mechanism of the prior art, FIG. 4 is an exploded view from a perspective point of view of a metering mechanism according to the invention, FIG. 5 is an exploded view from another perspective point of view of a metering mechanism according to the invention, FIG. 6 is a cross-sectional view along the longitudinal axis of a metering mechanism according to the invention.

Since the embodiments described hereinbelow are nonlimiting, it will in particular be possible to consider variants of the invention comprising only a selection of features described, isolated from the other features described (even if this selection is isolated within a sentence comprising these other features), if this selection of features is sufficient to confer a technical advantage or to differentiate the invention relative to the state of the prior art. This selection comprises at least one feature, preferably functional without structural details, or with only some of the structural details if this part alone is sufficient to confer a technical advantage or to differentiate the invention relative to the state of the prior art.

For conciseness and clarity, the elements bear the same references in the different figures.

FIGS. 1 and 2 each represent an embodiment of a proportional metering pump. It comprises a hydraulic machine 4 extending along a longitudinal axis 9, and provided with an inlet 40, an outlet 41, an access nozzle to a mixing chamber 43, and a metering mechanism 7. This metering mechanism 7 is provided with a suction valve 76 and communicates at one of its ends with a mixing chamber internal to the pump and, at the other of its ends, with a container of product to be sucked (not represented in the figure).

The hydraulic machine is provided with a member designed to perform a reciprocating movement, the supplying of the pump with liquid at the inlet triggering the reciprocating movement of the member, said movement alternately provoking a suction through the metering mechanism into the mixing chamber with opening of the suction valve 76 when the member moves away from the metering mechanism, then an expulsion at the outlet 41 of the pump with closure of the suction valve when the member approaches the metering mechanism.

The hydraulic machine can be of the type of that described in the document EP1971776 A1 and represented in FIG. 1.

This hydraulic machine comprises an enclosure comprising a body and a cover, a separation means designed to perform a reciprocating movement in the enclosure between the body and the cover, this separation means defining two chambers. The hydraulic machine also comprises hydraulic switching means for the abovementioned supplying of liquid to and the discharging from the chambers.

These switching means comprise a dispensing member that can take two stable positions and controlled by the movements of the separation means. The body of the enclosure also encloses a compartment linked to a pressurized liquid intake and in which are housed the switching means, as well as triggering means comprising a thruster linked to the separation means, designed to provoke, at the end of travel, an abrupt change of the position of the switching means, under the action of an elastic means, for reversing the travel.

The dispensing member comprises a dispensing slide valve pressed against a planar plate that is fixed relative to the body of the enclosure, the dispensing slide valve being able to slide in a seal-tight manner, without seal, against the plate which comprises orifices linked respectively to the chambers of the enclosure and to a liquid outlet orifice. The slide valve is then designed to, depending on its position, close some of the orifices or connect them with the fluid intake or with the exhaust.

The hydraulic machine can also be of the type described in the document EP1971774 A1 and represented in FIG. 2.

In this case, the hydraulic machine comprises an enclosure, a piston designed to slide by reciprocating movement in the enclosure, the piston dividing the enclosure into two chambers, hydraulic switching means for the supplying of liquid to and the discharging from the chambers separated by the piston.

These switching means are controlled by the movements of the piston and comprise at least one connecting rod acting on a dispensing member that can take two stable positions. It is also provided with the triggering means comprising a thruster designed to provoke, at the end of travel of the piston, an abrupt change of the position of the switching means, under the action of an elastic means, for reversing the travel. The elastic means is secured, at each of its ends, to an articulation member received respectively in a housing provided on the connecting rod and on another moving part of the hydraulic machine, each housing being open in a direction substantially opposite to the direction of the force exerted by the elastic means in the housing, such that each articulation member can be extracted from its open housing against said force.

As represented in more detail in FIGS. 4, 5 and 6, the proportional metering pump also comprises a metering mechanism 7 comprising a body 70 of substantially cylindrical form and extending along the axis 9 of the hydraulic machine. On this body are mounted, in succession, a sleeve 77 and an adjustment nut 71.

The coupling of the metering mechanism 7 with the hydraulic machine is performed as in FIG. 3, that is to say in particular by means of a nut 5 mounted on a shoulder 770 of the sleeve 77, so it is the latter that is thus rendered fixed relative to the hydraulic machine.

The body 70 is mounted only to translate, in the sleeve 77, such that the body 70 can only slide in the sleeve. The translation can be ensured by the cooperation of ribs and of grooves respectively formed on the inner circumferential surface of the sleeve and on the outer circumferential surface of the body 70. The rotational blocking of the body 70 relative to the sleeve can thus be ensured by a key.

The adjustment nut is capable of cooperating by screwing with said sleeve, said screwing then causing a rotation of the adjustment nut relative to the body of the metering mechanism.

Screwing is understood to mean a displacement in a Euclidian affine space which is the commutative compound of a rotation and of a translation along a vector directing the axis of rotation (in this case the axis 9). Thus, the cooperation by screwing of two parts should be understood in the broad sense and should not be limited to just the cooperation of threading between the two parts.

The body is extended by a valve seat (not represented in the figures) that can be closed by a valve (also not represented in the figures). The body is capable of accommodating a plunger, the reciprocating movement of which allows a suction at the valve seat. The travel of the plunger is a function of the position of screwing between the adjustment nut and the sleeve.

The metering mechanism further comprises means M for activating the blocking of the rotation between the adjustment nut and the body of the metering mechanism so as to prohibit the screwing and the unscrewing between the adjustment nut and the sleeve.

The blocking means comprise a ring 1 housed in a locking nut 2 mounted to rotate about the body 70. The ring 1 is capable of cooperating by screwing with the nut 2. The ring is mounted to translate around the body of the metering mechanism and allows a latitude of translational movement between a first position of abutment inside the locking nut and a second position of abutment against the adjustment nut involving the rotational blocking of the ring relative to the adjustment nut by complementarity of form.

The translation of the ring along the body of the metering mechanism is produced, according to a particular embodiment, by means of a slide link produced by means of at least one lug 10 formed on the inner circumferential surface of the ring, said lug being capable of sliding in a groove 79 formed on the outer circumferential surface of the body.

According to a variant, the ring is mounted to translate along the body of the metering mechanism by means of a slide link produced by means of at least one rib formed on the outer circumferential surface of the body, said rib being capable of sliding in a groove formed in the inner circumferential surface of the ring.

The cooperation of the ring by screwing with the locking nut is performed, according to a particular embodiment, by means of a slider formed on the outer circumferential surface of the ring, said slider being capable of sliding along a helix formed on the inner circumferential surface of the locking nut.

According to a variant, the ring cooperates by screwing with the locking nut by means of a slider 21 formed on the inner circumferential surface of the locking nut, said block being capable of sliding along a helix 11 formed on the outer circumferential surface of the ring.

The rotational blocking of the ring against the adjustment nut by complementarity of form is performed by means of a claw coupling formed between a face 12 of the ring and a shoulder 78 of the adjustment nut, facing one another. Claw should be understood to mean any device with teeth making it possible to couple two mechanical parts.

Advantageously, the means M for activating the blocking of the rotation between the adjustment nut and the body of the metering mechanism further comprise a circlip 3 which makes it possible to translationally block the locking nut relative to the body of the metering mechanism.

Advantageously, the metering mechanism comprises metering display means 74 formed on the outer circumferential surface of the sleeve and that can consist of a graduated indicator printed or etched on said outer circumferential surface. These display means cooperate with a viewing ring 72 making it possible to aim the graduation of the indicator.

Advantageously, the metering mechanism comprises sealing means 6 interposed between the body 70 and the sleeve 77.

The mounting of the metering mechanism on the hydraulic machine is performed by means of a nut (not represented in FIGS. 4 to 6), which comes into abutment on a shoulder 770. The sealing is then produced by means of a seal housed in a groove 771 formed on the outer circumferential surface of the sleeve. The interior of the body of the metering mechanism thus communicates with the mixing chamber of the hydraulic machine.

Now regarding the method for locking a metering mechanism conforming to one of the embodiments of the invention, the adjustment nut 71 is first of all turned to select the desired metered amount, then the blocking means M are activated by turning the locking nut 2 in order to bring the ring 1 into its second position of abutment against the adjustment nut in order to rotationally block the adjustment nut by complementarity of form.

To unlock the metering mechanism, the blocking means M are deactivated by turning the locking nut 2 in order to bring the ring 1 into its first position of abutment disengaged from the adjustment nut. The adjustment nut is once again free to rotate with respect to the ring 1, and therefore with respect to the body 70.

Obviously, the invention is not limited to the examples which have just been described and numerous improvements can be added to these examples without departing from the scope of the invention. Furthermore, the different features, forms, variants and embodiments of the invention can be associated with one another according to various combinations insofar as they are not mutually incompatible or exclusive.

The invention claimed is:

1. A metering mechanism (7) comprising a body (70) mounted to translate in a sleeve (77) which is itself mounted in an adjustment nut (71), said adjustment nut being capable of cooperating by screwing with said sleeve, said screwing then causing a rotation of the adjustment nut relative to the body of the metering mechanism, said body being extended by a valve seat (75) that can be closed by a valve (76) and that is capable of accommodating a plunger (8), the reciprocating movement of which allows at least a suction at the valve (76), the travel of the plunger being a function of the position of screwing between the adjustment nut and the sleeve, the metering mechanism further comprising means (M) for activating the blocking of the rotation between the adjustment nut (71) and the body of the metering mechanism (70) so as to prohibit the screwing and the unscrewing between the adjustment nut and the sleeve, said means comprising a ring (1) housed in a locking nut (2) mounted to rotate around the body (70), said ring cooperating by screwing with said locking nut, said ring being mounted to translate only around and along the body of the metering mechanism between a first position of abutment at the bottom of the locking nut and a second position of abutment against the adjustment nut involving the rotational blocking of the adjustment nut rendered secured by complementarity of form with the ring.

2. The metering mechanism as claimed in claim 1, wherein the ring is mounted to translate along the body of the metering mechanism by means of a slide link produced by means of at least one lug (10) formed on the inner circumferential surface of the ring, said lug being capable of sliding in a groove (79) formed on the outer circumferential surface of the body.

3. The metering mechanism as claimed in claim 2, wherein the ring cooperates by screwing with the locking nut by means of a slider formed on the outer circumferential surface of the ring, said slider being capable of sliding along a helix formed on the inner circumferential surface of the locking nut.

4. The metering mechanism as claimed in claim 2, wherein the ring cooperates by screwing with the locking nut by means of a slider (21) formed on the inner circumferential surface of the locking nut, said block being capable of sliding along a helix (11) formed on the outer circumferential surface of the ring.

5. The metering mechanism as claimed in claim 2, wherein the rotational blocking by complementarity of form of the ring against the adjustment nut is performed by means of a claw coupling formed between a face (12) of the ring and a shoulder (78) of the adjustment nut, facing one another.

6. The metering mechanism as claimed in claim 1, wherein the ring is mounted to translate along the body of the metering mechanism by means of a slide link produced by means of at least one rib formed on the outer circumferential surface of the body, said rib being capable of sliding in a groove formed in the inner circumferential surface of the ring.

7. The metering mechanism as claimed in claim 6, wherein the ring cooperates by screwing with the locking nut by means of a slider formed on the outer circumferential surface of the ring, said slider being capable of sliding along a helix formed on the inner circumferential surface of the locking nut.

8. The metering mechanism as claimed in claim 6, wherein the ring cooperates by screwing with the locking nut by means of a slider (21) formed on the inner circumferential surface of the locking nut, said block being capable of sliding along a helix (11) formed on the outer circumferential surface of the ring.

9. The metering mechanism as claimed in claim 6, wherein the rotational blocking by complementarity of form of the ring against the adjustment nut is performed by means of a claw coupling formed between a face (12) of the ring and a shoulder (78) of the adjustment nut, facing one another.

10. The metering mechanism as claimed in claim 1, wherein the ring cooperates by screwing with the locking nut by means of a slider formed on the outer circumferential surface of the ring, said slider being capable of sliding along a helix formed on the inner circumferential surface of the locking nut.

11. The metering mechanism as claimed in claim 10, wherein the rotational blocking by complementarity of form of the ring against the adjustment nut is performed by means of a claw coupling formed between a face (12) of the ring and a shoulder (78) of the adjustment nut, facing one another.

12. The metering mechanism as claimed in claim 1, wherein the ring cooperates by screwing with the locking nut by means of a slider (21) formed on the inner circumferential surface of the locking nut, said block being capable of sliding along a helix (11) formed on the outer circumferential surface of the ring.

13. The metering mechanism as claimed in claim 1, wherein the rotational blocking by complementarity of form of the ring against the adjustment nut is performed by means of a claw coupling formed between a face (12) of the ring and a shoulder (78) of the adjustment nut, facing one another.

14. The metering mechanism as claimed in claim 1, wherein the means (M) for activating the blocking of the rotation between the adjustment nut and the body of the metering mechanism further comprise a circlip (3) capable of translationally blocking the locking nut relative to the body of the metering mechanism.

15. The metering mechanism as claimed in claim 1, wherein the mechanism comprises metering display means formed on the outer circumferential surface of the sleeve, these means implementing a graduated indicator (74) printed or etched on the outer circumferential surface of the sleeve and a viewing ring (72) making it possible to aim the graduation of the indicator.

16. The metering mechanism as claimed in claim 1, wherein the mechanism comprises sealing means (6) interposed between the body and the sleeve.

17. The metering mechanism as claimed in claim 1, wherein the sleeve comprises a shoulder (770) capable of retaining a fixing nut (5) on a hydraulic machine.

18. A proportional metering pump comprising a hydraulic machine (4) provided with an inlet (40) and an outlet (41), a metering mechanism (7) communicating at one of its ends with an access nozzle to a mixing chamber internal to the pump and, at the other of its ends, with a tank of product to be metered, the hydraulic machine extending along a longitudinal axis (9) and enclosing a member designed to perform a reciprocating movement, the supplying of the pump with liquid at the inlet triggering the reciprocating movement of the member, said movement alternately provoking a suction through the metering mechanism into the mixing chamber with opening of a suction valve (76) when the member moves away from the metering mechanism then an expulsion at the outlet (41) of the pump with closure of the suction valve when the member approaches the metering mechanism, wherein the metering mechanism (7) conforms to claim 1.

19. A method for locking a metering mechanism as claimed in claim 1, wherein:
- the adjustment nut (71) is turned to select the desired metered quantity,
- the means (M) are activated by turning the locking nut (2) in order to bring the ring (1) into its second position of abutment against the adjustment nut in order to rotationally block the adjustment nut (71) by complementarity of form.

20. A method for unlocking a metering mechanism as claimed in claim 1, wherein the means (M) are deactivated by turning the locking nut (2) in order to bring the ring (1) into its first position of abutment disengaged from the adjustment nut, in order to render the adjustment nut (71) free to rotate with respect to the ring.

\* \* \* \* \*